March 26, 1935.  W. ALBERSHEIM ET AL  1,995,285
RADIO NAVIGATION
Filed Jan. 25, 1929
*Fig. 1*
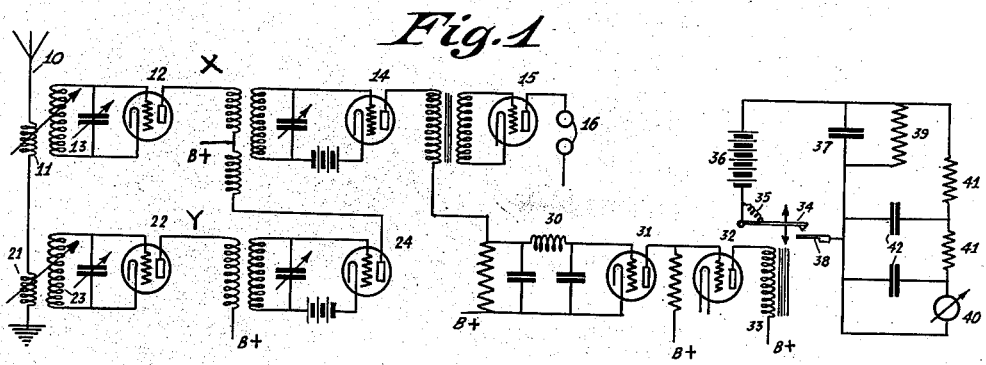
*Fig. 2*
*Fig. 3*
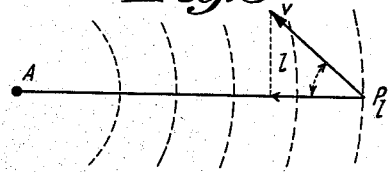
*Fig. 4*  *Fig. 5*  *Fig. 6*
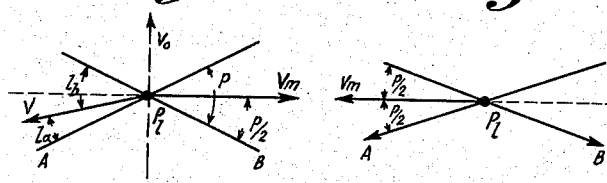
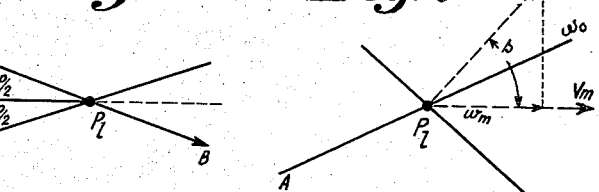
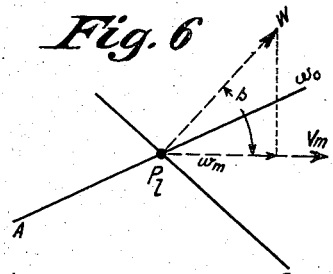
*Fig. 7*
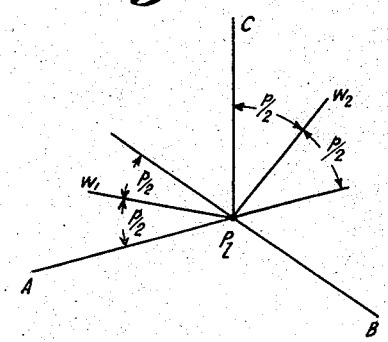
*Fig. 8*
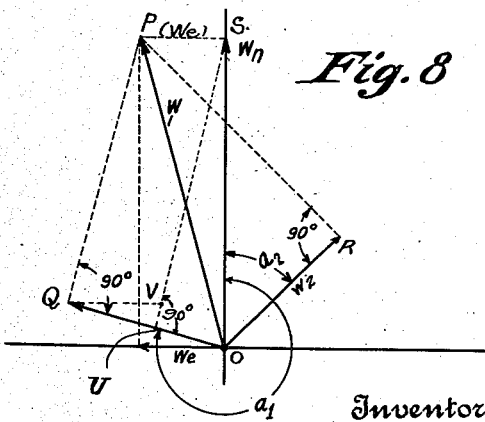
Inventors
W. ALBERSHEIM
H. KONHEIM
By Harry Cohn
Attorney Patented Mar. 26, 1935

1,995,285

UNITED STATES PATENT OFFICE 1,995,285

RADIO NAVIGATION

Walter Albersheim and Harvey Konheim,
New York, N. Y.

Application January 25, 1929, Serial No. 335,087

11 Claims. (Cl. 250—2)

This invention relates to an aeronautical navigation method and means.

We are aware that radio-beam beacons have been employed as a means to guide an air-ship in its flight; and also that it has been proposed to use directional loops as a means to determine the position of a ship in flight.

It is an object of this invention to provide a method and means for measuring the speed of travel of a ship in the air with respect to the ground.

It is a further object of this invention to provide a method and means for determining the position of a ship in flight.

Further, it is an object of this invention to provide a method and means for determining the magnitude and direction of wind drift as it effects a ship in flight.

Briefly, the objects of our invention are accomplished as follows:

Continuous wave oscillations of equal frequencies are broadcast simultaneously from two transmitters placed at separate fixed points. It will be demonstrated mathematically, that a ship having two separate receivers, each of which is adjusted to receive one of the said broadcast waves, and both receivers arranged to feed into a common mixing tube, will produce a beat note, which beat note is due to the motion of the ship in the common field of the transmitters and the frequency of said beat is a known function of the location and direction of travel of the ship.

In actual practice the beat note thus produced is below audibility, and we have therefore devised a circuit which will enable such frequency to be indicated visually.

Having determined the frequency of the beat note, in accordance with the principles of this invention the location of the ship, direction of flight and wind drift may be readily determined.

The manner in which our invention is carried out will more clearly appear from the following description taken in connection with the accompanying drawing in which:

Fig. 1 is a diagrammatic representation of a receiving apparatus used in accordance with this invention; and Figs. 2–8 are diagrams used in explaining the principles of this invention.

Two separate transmitters are located at the points A and B, Figs. 4–7, for example, each of the transmitters operating in "unison" that is, on identical frequencies. Means for broadcasting oscillations on identical frequencies, or on frequencies one of which is an integral multiple of the other, are well known in the art. Therefore, we shall describe below only briefly the principle preferably used in accordance with our invention for such broadcasting.

A first station indicated as A (see Figs. 4–7) broadcasts a continuous wave of a high frequency, for example, 15 megacycles. Preferably this continuous wave is modulated to a small percentage by a fixed musical note having a frequency of 400 cycles per second, for example. However, such modulation serves merely as an aid to the identification of the station A, and may be omitted without departing from the spirit of this invention. Another advantage of using this modulation by an audio frequency resides in the fact that the modulated continuous wave may then be used for the transmission of code messages.

Station B (see Figs. 4–7) receives this signal transmitted by A, filters out the modulated frequency and amplifies it. This received signal from A then serves as "master oscillation" for the transmitter of B, which is thereby bound to broadcast in unison with A. Precaution must be taken to prevent the output of the B transmitter from feeding back into the receiver and causing self-sustained oscillations in the transmitter of B independent of A's signal. Station B may also modulate a small percentage of this continuous wave with a musical note having a frequency of, for example, 500 cycles per second for the purposes of identification and the transmission of code messages.

A desirable modification of this method consists in passing the signal received in B through a frequency multiplier, the output of which serves as master oscillation for the transmitter. Station B will thus broadcast on a harmonic of A's wave. This will make it easier to avoid regeneration in B and also to equalize reception of the signals from A and B respectively in the vehicle, which is a desirable feature.

Referring in detail to Fig. 1, we have shown one specific arrangement for receiving the two broadcast waves from the transmitters A and B. For the sake of simplicity A and B batteries are omitted from the diagram of this figure. An antenna 10 indicates diagrammatically the means for intercepting the signal waves being broadcast from stations A and B. Coupled to the antenna 10 at 11 is the first radio receiver X, having any desired number of stages of radio frequency amplification indicated diagrammatically by the radio frequency amplifying tube 12. The input circuit 13 of the amplifier 12 is variably coupled to the antenna at 11, this variable coupling serving as a convenient volume control for energy reproduced in the first receiver. Coupled to the output circuit of the radio frequency amplifier 12 is a mixing tube or detector 14; and to the output circuit of this tube 14 is connected any suitable number of stages of audio frequency amplification indicated diagrammatically by audio frequency amplifying tube 15, to the output of which there is in turn connected the ear phones 16.

Assuming, for example, that the receiver X is tuned to the frequency of the transmitter at B, the signal energy received from B at the antenna 10 is amplified at 12; detected at 14; again amplified at 15; and made audible at 16. This apparatus thus far described is nothing more than a conventional radio receiving set and the structural details thereof may be varied in accordance with the well known principles applied to radio receivers, without departing from the spirit of this invention.

A second radio receiver Y is variably coupled to the antenna 10 at 21. This second receiver comprises a suitable number of stages of radio frequency amplification indicated diagrammatically by the radio frequency amplifying tube 22, whose input circuit is coupled to the antenna 10 at 23. Since the present receiving apparatus being described is designed for use in accordance with that modification of our invention in which the station B is designed to broadcast on a frequency which is an integral multiple of the frequency of the station A, the receiver Y which is tuned to the lower frequency of the transmitter at A is provided with a frequency multiplier 24, which is tuned to bring the frequency of the energy received by the amplifier 22, up to the frequency being received in the receiver X. The output circuit of the tube 24 is also coupled to the input of the detector 14.

Here again, as described in connection with receiver X, the receiver Y functions as a conventional radio receiving apparatus except, perhaps, for the inclusion of the frequency multiplier, and the energy transmitted from station A is made audible through the receiver Y in the ear phones at 16. It will be understood that when the ship carrying receivers X and Y is stationary with respect to the stations A and B, and both of these stations are sending out their continuous wave oscillations of equal frequency, or of frequencies which are integrally related, and further when these continuous wave oscillations transmitted from the separate stations are modulated by two separate musical notes as indicated above; then, both of these musical notes will be indicated in the ear phones at 16. Since it is preferable that such signals received on the separate receiver X and Y be of equal volume, the couplings at 11 and 21 are adjusted to realize this equality. We have thus far described an arrangement for receiving the two transmitted continuous wave oscillations sent out from stations A and B. Now, in accordance with the principles of this invention, the movement of the ship carrying the receiver as described above in the common field of these two transmitters will produce a beat note, which beat note we have found, in actual practice, to be below the range of audibility. We have therefore devised a certain arrangement for indicating this sub-audible beat note. While we have disclosed one specific arrangement for indicating this beat note, it will be clear that many similar arrangements will readily suggest themselves to those skilled in the art without departing from the spirit and scope of this invention, and therefore the specific embodiment of the indicating device which we disclose herein is merely used by way of illustration and that we therefore do not intend to be limited to details of structure shown.

Referring still to Fig. 1, the low frequency indicating apparatus will now be described. Coupled to the output of the detector tube is a low pass filter 30. The cut-off of this filter is adjusted to prevent any of the audible signals which are effective in amplifier 15 from reaching the apparatus which is connected to the present filter. In other words, the apparatus which is now to be described is acted upon only by electrical waves below the range of audibility. The sub-audible frequencies which appear in the output circuit of the detector tube 14 are not reproduced in the amplifier 15 since they are sub-audible but are passed through the filter 30 to the amplifier tube 31, which tube boosts the amplitude of these low frequency impulses to a point where they completely over-saturate the relay tube 32, into which the tube 31 is connected to feed. In the sub-audible frequency apparatus we preferably use resistance coupling as shown. The apparatus is adjusted so that the grid-swing of the tube 32 is so high, that the plate current of the tube 32 jumps suddenly from zero to saturation value and back at the impressed frequency of the sub-audible oscillations. In the output circuit of the tube 32 there is connected an electromagnetic relay 33, having a tongue 34 which will be jerked from rest position to work position and back with a very abrupt movement corresponding to variations in plate current in the tube 32. A spring 35 is attached to the tongue 34 to impart movement thereto when the relay is de-energized. Connected in the circuit of the tongue 34 is a direct current source 36 having a potential of 200 volts, for example. From this source of potential the circuit is followed back through a condenser 37 to the contact point 38. Midway between rest and work position the relay tongue 34 passes the contact point 38, thus quickly making and breaking contact twice for every low frequency beat that is passed through the sub-audible frequency apparatus. Every contact between the tongue 34 and the point 38 momentarily connects the direct current supply 36 across the condenser 37 as shown. The condenser 37 has a capacity preferably of one microfarad and the resistance 39 is of 100,000 ohms.

The charge on condenser 37 will leak away through resistance 39 at a rate which reduces the initial voltage to 0.368 of its original value in $\frac{1}{10}$ of a second. The condenser instantaneously charged to E volts will be discharged during the half period of the beat frequency "$h$", before it receives a new charge, down to the value $$V = E\left(e^{-\frac{1}{2hRC}}\right)$$

where
E = initial voltage
e = base of natural logarithms
h = beat frequency
R = resistance of leak
C = capacity of condenser The average voltage across the condenser during that time is $$E_{av.} = 2hE \int_{t=0}^{\frac{1}{2}h} e^{-\frac{t}{Rc}} dt$$

where $t$ = time $$= 2h \cdot E \cdot R \cdot C\left(1 - e^{-\frac{1}{2hRC}}\right)$$

It therefore appears that $E_{av}$, the average voltage across condenser $C_1$ is a definite function of the beat frequency $h$. For zero beat, this average voltage is zero. For very high beat frequencies the term $$e^{-\frac{1}{2hRC}}$$

approaches $$1-\frac{1}{2hRC}$$

and the average voltage is close to the charging voltage $E$. For a beat frequency of 5 per second and the above values of $E$, $C$, and $R$, we have:

$$E_{av.} = 2 \cdot 5 \cdot 200 \cdot 10^{-6} \cdot 10^{-5}(1-e^{-1})$$
$$= 126.4 \text{ volts}$$

This average voltage can be measured on a direct current instrument. The periodical fluctuations can be suppressed by damping the instrument mechanically and retarding it electrically. Accordingly, we connect a direct current meter 40 across the condenser 37, and provide resistances 41 and capacities 42 connected as shown in Fig. 1 in order to retard electrically the variations of the indicator of meter 40. The electrical retardation is accomplished in the following manner:

Referring still to Fig. 1, the condenser 37 (capacity 1 mfd.) is periodically charged as described above by the action of the beat note acting upon the relay at 34, and discharged through the shunting resistance 39 (R=100,000 ohms). The meter 40 is a milliammeter reading full scale at 0.1 m.A. Between the condenser 37 and the meter 40 is connected attenuator of low pass character, consisting of the two resistances 41 ($r=1$ megohm) and 2 mfd. capacity 42. At the beat note frequency $h=5$/sec. chosen for example, the impedance of 42 is 80,000 ohms and the amplitude of fluctuations is reduced 8% (calculated from general filter formula) by the action of the electrical retarder or attenuator. Of course, the meter may be magnetically and/or mechanically damped to any desired degree in addition. The scale of meter 40 may readily be calibrated in frequency units. Thus it will be seen that we have provided a receiving equipment adapted to be installed in an airplane, for example, which receiver will record directly heterodyne beats produced by movement of the plane in the common field of the transmitters at A and B.

Above, suitable means have been described for detecting and measuring the frequency of a heterodyne beat below 15/sec.

It remains to be proved that such a heterodyne beat is set up in the common field of two radio frequency transmitters of equal or harmonic frequencies, by the motion of a receiver installed in a plane or similar vehicle; and further, that the frequency of such beat note is a known function of and therefore a means for calculating the location and direction of the vehicle.

The principle is illustrated by the sketch of Figure 2. A is a broadcasting station sending out waves of a frequency: $n$/sec. ($=15$ megacycles). These spread out at the speed of light (C=about 186000 miles/sec. At $P_1$ they meet an aeroplane flying towards A at a speed of V=100 miles per hour and carrying a receiving set. It is evident, that the plane will cross more waves per second, than if it remained immobile at point $P_1$. The increased number of encountered waves, which will be tuned in and reacted upon the receiver, is $$n_v = n\left(1 + \frac{v}{c}\right) \quad \text{Eq. 3}$$

In our example, $v/c$ has the small value $$\frac{100}{3600 \times 186000}$$

or $$1.5 \times 10^{-7}.$$

The change of frequency is $n$ times $v/c$, which in our case amounts to 2.25 cycles per second.

Now let us assume that the plane, still flying at 100 miles an hour, changes its direction so that it flies at an angle $l$ to the radius vector A—$P_1$, as shown in Fig. 3.

The lateral component of flight, $v \times \sin l$, will not influence the reception frequency at all, and the frequency shift will be due and proportional to the longitudinal component: $v \cdot \cos l$. The total change will be $$n_{v1} = n\left(1 + \frac{v}{c}\cos l\right) \quad \text{Eq. 4}$$

Furthermore let us assume that the broadcasting frequency is $n_a$, but that the receiver contains a frequency multiplier, which brings the detector input up to the frequency $n^d = k.n^a$. From Equation 4 it follows that the broadcast wave is received with the frequency:

$$n'_a = n_a\left(1 + \frac{v}{c}\cos l\right) \quad \text{Eq. 5}$$

After passing the frequency multiplier, it reaches the detector with the frequency:

$$n'_d = kn'_a = kn_a\left(1 + \frac{v}{c}\cos l\right)$$
$$= n_d\left(1 + \frac{v}{c}\cos l\right) \quad \text{Eq. 6}$$

It is seen that no matter which was the original broadcast wave, the frequency change in the detector is equal to the detector frequency multiplied by the speed with which the plane approaches the broadcasting station, and divided by the speed of light.

In Fig. 4 we see the plane $P_1$ flying in the field of two broadcasting stations A and B with speed and direction indicated by vector $v$. It approaches A at the rate of $v \cdot \cos l_a$, and leaves B at the rate of $v \cdot \cos l_b$. If both stations are in unison or at harmonic frequencies, brought to unison in the common detector, the frequency shift will be $$+n_d \cdot \frac{v \cos l}{C}$$

for station A, and $-n^b.v/c. \cos l^b$ for station B. This will produce a heterodyne beat of $$h = n_d \frac{v}{c}(\cos l_a + \cos l_b) \quad \text{Eq. 7}$$

Since the radii $P_1$—A and B—$P_1$ form an angle P, we can transform Equation 7 into:

$$h = n_d \frac{v}{c}[\cos l_a + \cos(P - l_a)] \quad \text{Eq. 8}$$

At a given location and a given speed this value of $h$ is a function of $l_a$ alone. It becomes zero for $$l_a = \frac{P + \pi}{2} + k\pi \quad \text{Eq. 9}$$

that is when $v^o$ has the near vertical direction shown in Fig. 4, which equally divides the complementary angle of $p$. It becomes a maximum for $$\frac{d}{dl_a}[\cos l_a + \cos(P-l_a)] = 0 \quad \text{Eq. 9}$$

which leades to:

$$l_a = \frac{P}{2} + k\pi \quad \text{Eq. 10}$$

that is, when $v_m$ has the near horizontal direction shown in Fig. 7, which equally divides the angle P. If we substitute the result of Eq. 10 into Eq. 8, we find:

$$h_{max} = 2n_d \cdot \frac{v}{c} \cdot \cos\frac{P}{2} \quad \text{Eq. 11}$$

Let us first assume that there is no wind drift. In Eq. 11, $n_d$ is known as the constant detector frequency; $c$, the propagation speed of light and electric waves, is a universal constant. $v$ is the driving speed of the plane, which can be measured by a revolution counter at the propeller shaft, (speedometer). Consequently, from $h_{max}$ we can directly derive $$\cos\frac{P}{2}$$

and $p$ itself.

The procedure for location finding therefore is to make a circular flight and observe direction of flight and beat frequency at the moment of maximum beat. Lines drawn at angles P as shown in Fig. 5, on both sides from the direction of maximum beat will point straight towards the broadcasting stations A and B, respectively. Since the location of A and B is known, these two beam directions are sufficient data to calculate the position of $P_1$ by methods known of spherical trigonometry and used for location finding by the well known directional loop method.

Now let us consider the influence of a wind-drift $w$ in the direction indicated in Fig. 6, and pointing at an angle $s$ from the direction of maximum beat. We can split the wind force into two components; one of them, $w_m = w \cos s$ points in the direction of maximum beat and influences our results. The other, $w_o = w \sin s$ points at right angles to $w_m$ and according to Eq. 9 does not influence the beat frequency at all.

If our plane, under the impact of $w$, flies a full circle, the navigator will observe two maxima of the beat frequency. They occur at the same directions plus or minus $v_m$ that they would have at windless flight; only their amounts are different. In the direction aided by the wind drift, the maximum will be $$h_1 = 2n_d \cos\frac{P}{2} \cdot \frac{v+w_m}{c} \quad \text{Eq. 12}$$

in the opposite direction:

$$h_2 = 2n_d \cos\frac{P}{2} \cdot \frac{v-w_m}{c} \quad \text{Eq. 13}$$

If we form the half sum of these values, we find $$h_{plane} = \frac{h_1+h_2}{2} = 2n_d \cos\frac{P}{2} \cdot \frac{v}{c}$$

which is our old value of Equation 11 for the beat note caused by the plane alone; it eliminates the wind influence. If we form the half difference of 12 and 13, we find $$h_{wind} = \frac{h_1-h_2}{2} = 2n_d \cos\frac{P}{2} \cdot \frac{w_m}{c} \quad \text{Eq. 14}$$

From this equation we can directly derive $w_m$, the wind component in the direction $v_m$.

If there are two pairs of broadcasting stations transmitting on two pairs of harmonic frequencies, the same procedure can be followed with both of them. This gives a check on the location findings of each test, and at the same time the wind component is found in a second direction, which enables us to calculate the total wind strength and direction.

It is even sufficient, if in addition to the two stations A and B there is a third station C (preferably not located in a straight line with A and B), broadcasting on a (third) harmonic of the same fundamental frequency as A and B.

The receiving apparatus has tuning means allowing to receive and beat first, for example, the frequencies of A and B, then those of A and C. This furnishes a double check on the location findings and two directional wind components: $w_1$ for A and B and $w_2$ for A and C, as shown in Fig. 7.

In Fig. 8 it is shown graphically, how from the wind components $w_1$ and $w_2$ we can find the total wind vector $w$ and the north and east components $w_n$ and $w_e$.

Algebraically, we have the following solution:

$$OU = OS \cos(\angle USO) = w_n \cos a_1 \quad \text{Eq. 15a}$$

$$QV = PS = w_e \quad \text{Eq. 15b}$$

In $\triangle QVU$:

$$QU = QV \sin(\angle QVU) = w_e \sin a_1$$

By addition:

$$QO = QU + UO = w_e \sin a_1 + w_n \cos a_1 = w_1 \quad \text{Eq. 15}$$

Similarly:

$$w_2 = w_e \sin a_2 + w_n \cos a_2 \quad \text{Eq. 16}$$

Multiplying Equation 15 by $\cos a_2$ and rearranging:

$$w_e \sin a_1 \cos a_2 = w_1 \cos a_2 - w_n \cos a_1 \cos a_2 \quad \text{Eq. 18a}$$

Multiplying Equation 16 by $\cos a_1$:

$$w_e \sin a_2 \cos a_1 = w_2 \cos a_1 - w_n \cos a_2 \cos a_1 \quad \text{Eq. 18b}$$

Subtracting 18b from 18a:

$$w_e(\sin a_1 \cos a_2 - \cos a_1 \sin a_2) = w_1 \cos a_2 - w_2 \cos a_1$$

or $$w_e = \frac{w_2 \cos a_1 - w_1 \cos a_1}{\sin a_2 \cos a_1 - \cos a_2 \sin a_1}$$

or $$w_e = \frac{w_2 \cos a_1 - w_1 \cos a_2}{\sin(a_2 - a_1)} \quad \text{Eq. 18}$$

Multiplying Equation 15 by $\sin a_2$:

$$w_n \cos a_1 \sin a_2 = w_1 \sin a_2 - w_e \sin a_1 \sin a_2 \quad \text{Eq. 17a}$$

Multiplying Equation 16 by $\sin a_1$:

$$w_n \cos a_2 \sin a_1 = w_2 \sin a_1 - w_e \sin a_1 \sin a_2 \quad \text{Eq. 17b}$$

Subtracting 17b from Equation 17a:

$$w_n \times (\cos a_1 \sin a_2 - \cos a_2 \sin a_1) = w_1 \sin a_2 - w_2 \sin a_1$$

$$w_n = \frac{w_1 \sin a_2 - w_2 \sin a_1}{\cos a_1 \sin a_2 - \cos a_2 \sin a_1}$$

or $$w_n = \frac{w_1 \sin a_2 - w_2 \sin a_1}{\sin(a_2 - a_1)} \quad \text{Eq. 17}$$

Having thus described our invention, we claim:

1. An apparatus of the class described comprising in combination, a first receiving means, a second receiving means, means to produce a beat note of a frequency below audibility, and means to produce a visual indication in accordance with the frequency of said beat note.

2. An apparatus of the class described comprising in combination, a first receiving means, a second receiving means, a detector common to both said means, means coupled to said detector to produce audible signals received on both said first and said second receiving means, means coupled to said detector to reproduce a sub-audible beat note, and means visually to indicate the frequency of said beat note.

3. An apparatus of the class described comprising in combination, a first receiving means, a second receiving means, a detector common to both said means, means coupled to said detector to produce audible signals received on both said first and said second receiving means, means coupled to said detector to reproduce a sub-audible beat note, a low pass filter having a cut-off below audibility interposed between said last mentioned means and said detector, and means visually to indicate the frequency of said beat note.

4. In a device of the character described, means to indicate the frequency of sub-audible electrical oscillations comprising in combination, a relay, a condenser, a source of direct current arranged to be connected across said condenser periodically under control of said relay, a high resistance connected across said condenser, and a direct current meter connected across said condenser, whereby to indicate the electrical potential thereacross.

5. In a device of the character described, means to indicate the frequency of sub-audible electrical oscillations comprising in combination, means to reproduce the said oscillations, a relay connected to said last mentioned means, a circuit including a condenser and a source of direct current, means operable by said relay to open and close said circuit in accordance with the oscillations reproduced, whereby the said condenser is charged periodically, means to discharge the condenser in a predetermined time interval, and means to indicate the potential across said condenser.

6. In a device of the character described, means to indicate the frequency of sub-audible electrical oscillations comprising in combination, means to reproduce the said oscillations, a relay connected to said last mentioned means, a circuit including a condenser and a source of direct current, means operable by said relay to open and close said circuit in accordance with the oscillations reproduced, whereby the said condenser is charged periodically, means to discharge the condenser in a predetermined time interval, means to indicate the potential across said condenser, and means to attenuate the response of said last mentioned means.

7. In a device of the character described, means to indicate the frequency of sub-audible electrical oscillations comprising in combination, means to reproduce the said oscillations, a relay connected to said last mentioned means, a circuit including a condenser and a source of direct current, means operable by said relay to open and close said circuit in accordance with the oscillations reproduced, whereby the said condenser is charged periodically, means to discharge the condenser in a predetermined time interval, means to indicate the potential across said condenser, and means to attenuate electrically the response of said last mentioned means.

8. A frequency indicating device comprising in combination a circuit having a condenser and a source of direct current energy, a movable contact constructed and arranged to open and close said circuit, a relay operative under control of the energy whose frequency is to be measured to move said contact, whereby said condenser is charged periodically in accordance with the frequency to be indicated, a leak resistance connected across said condenser, and means to indicate the potential across said condenser.

9. A frequency indicating device comprising in combination a circuit having a condenser and a source of direct current energy, a movable contact constructed and arranged to open and close said circuit, a vacuum tube relay having a grid-swing of such nature that the electrical energy whose frequency is to be measured causes the plate current of said tube to go from zero to over-saturation for one cycle of said energy, a condenser, means operable by said change in plate current to charge said condenser, means to permit said charge to leak away at a predetermined rate, and means to measure the potential across said condenser.

10. The method of determining the position of a vehicle in the common field of two radiating stations of known location, which comprises moving said vehicle relatively to said stations, producing a beat note between signals transmitted from said stations by said movement, determining the frequency of said beat note, and determining the angle formed by lines drawn from the vehicle to said stations from the relation:

$$h = 2n_d \cdot \frac{v}{c} \cdot \cos \frac{P}{2},$$

where $h$ is the beat frequency, $n_d$ is the constant detector frequency, $v$ is the driving speed of the vehicle, $c$ is the speed of light, and P is the angle formed by lines drawn from said vehicle to said stations.

11. In the art of radio navigation, the method of determining the location of a vehicle in the common field of two stations radiating in unison which comprises receiving a beat note produced by said radiated energy and calculating position from the known frequency of beat note in the relation $$h = 2n_d \cdot \frac{v}{c} \cdot \cos \frac{P}{2}$$

where $h$ is the beat frequency, $n_d$ is the constant detector frequency, $v$ is the driving speed of the vehicle, $c$ is the speed of light, and P is the angle formed by lines drawn from said vehicle to said stations.

WALTER ALBERSHEIM.
HARVEY KONHEIM.